(12) United States Patent
Calfo et al.

(10) Patent No.: US 6,879,075 B2
(45) Date of Patent: Apr. 12, 2005

(54) TRAPEZOIDAL SHAPED MAGNET FLUX INTENSIFIER MOTOR POLE ARRANGEMENT FOR IMPROVED MOTOR TORQUE DENSITY

(75) Inventors: Raymond Mark Calfo, Murrysville, PA (US); Mark Peter Krefta, Murrysville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 0 days.

(21) Appl. No.: 10/356,261

(22) Filed: Jan. 31, 2003

(65) Prior Publication Data

US 2004/0150283 A1 Aug. 5, 2004

(51) Int. Cl.[7] .............................................. H02K 21/12
(52) U.S. Cl. ............. 310/156.01; 310/200; 310/156.48; 310/184; 310/185; 310/254; 310/257
(58) Field of Search .......................... 310/156.01, 200, 310/156.48, 156.66, 184, 185, 254, 257, 156, 158

(56) References Cited

U.S. PATENT DOCUMENTS

| 3,168,686 A | 2/1965 | King et al. |
|---|---|---|
| 3,205,415 A | 9/1965 | Seki et al. |
| 3,237,034 A | 2/1966 | Krasnow |
| 3,334,254 A | 8/1967 | Kober |
| 3,768,054 A | 10/1973 | Neugebauer |
| 4,339,874 A | 7/1982 | Mc'Carty et al. |
| 4,517,483 A | 5/1985 | Hucker et al. |
| 4,700,097 A | 10/1987 | Kawada et al. |
| 4,714,852 A | 12/1987 | Kawada et al. |
| 5,013,951 A | 5/1991 | Stadnik et al. |
| 5,280,209 A | 1/1994 | Leupold et al. |
| 5,298,827 A | 3/1994 | Sugiyama |
| 5,302,876 A | 4/1994 | Iwamatsu et al. |
| 5,355,044 A | 10/1994 | Uchida et al. |
| 5,857,762 A | 1/1999 | Schwaller |
| 6,459,185 B1 | 10/2002 | Ehrhart et al. |

*Primary Examiner*—Darren Schuberg
*Assistant Examiner*—Iraj A. Mohandesi
(74) *Attorney, Agent, or Firm*—Reed Smith LLP

(57) ABSTRACT

A permanent magnet synchronous machine with improved torque and power characteristics. A circumferential-oriented rotor assembly is provided with alternating permanent magnets and magnetic pole pieces. In order to reduce the amount of leakage flux in the rotor and increase the effective length of the permanent magnet, a trapezoidal or otherwise tapered permanent magnet structure is used. By alternating trapezoidal permanent magnet, and magnetic pole pieces, a higher intensity magnetic field is created in the air gap utilizing the same radial space in the motor without altering the weight or volume of the motor compared to conventional machines.

21 Claims, 6 Drawing Sheets

TRAPEZOIDAL SHAPED MAGNET FLUX INTENSIFIER MOTOR POLE ARRANGEMENT FOR IMPROVED MOTOR TORQUE DENSITY

BACKGROUND OF THE INVENTION

1. Field of the Invention

The present invention relates generally to synchronous machines, and, more specifically, the present invention is directed to permanent magnet synchronous machines with improved torque and/or power density characteristics.

2. Description of the Background

Recent advancements and applications of at least three technologies—microprocessors, power semiconductors and rare earth permanent magnets—has significantly contributed to the development of permanent magnet synchronous motors. Permanent magnet motors are typically characterized by the distinct advantages of simple construction, high efficiency, high power factor, and high power density. These types of motors are therefore well suited to ship and other vehicle propulsion systems.

As the size and weight of vehicles has rapidly increased, the development of advanced propulsion systems has inherently involved the design and construction of advanced large power, low speed propulsion motors. Space and weight constraints play a major role in the development and selection criteria. That is, it is generally advantageous to maximize the torque density or torque per unit weight of the motor.

Over the past several years, high performance, high efficiency, and lightweight electrical motors using advanced magnetic materials have been developed. Permanent magnet (PM) synchronous machines take advantage of both the advances in magnetic materials and electronic design to provide improvements in torque and power density. These permanent magnet motors have been designed and developed for many different electromagnetic configurations and approaches.

There are several types of rotor structures or topologies for PM synchronous motors. In general, the structures of the rotor in these machines can be divided into radial and transversal or circumferential forms depending on the orientation of the magnetization direction of the magnet. FIG. 1 shows a block diagram of PM synchronous machines comprising both a radial (FIG. 1(A)) and a circumferential (FIG. 1(B)) rotor structure. The basics components of each machine are generally the same.

As seen in FIG. 1(A), a radial-oriented rotor PM synchronous machine is characterized by a magnetic rotor core 10 with a plurality of radial-oriented permanent magnets 15 spaced around the outside of the rotor core 10. The iron core stator 20 with circumferential stator teeth 25 is oriented around the outside of the rotor, separated by an air gap. The flux path through the air gap of the radial oriented synchronous machine is shown as arrows 30. In the radial magnet arrangement of FIG. 1(A), the permanent magnets 15 operate in series.

For applications requiring high power density and performance, that is, a smaller motor volume for a given torque or power rating, with a comparatively high efficiency and power factor, the circumferential structure shown in FIG. 1(B) is potentially more suitable than the radial structure of FIG. 1(A). The circumferential-oriented magnet design is characterized by a non-magnetic rotor core 50 with alternating circumferential-oriented permanent magnets 55 and iron rotor pole pieces 60 around the outside of the rotor core 50. The stator may be the same as in the radial-oriented magnet design. In this circumferential arrangement, two permanent magnets act together to supply the air gap flux. A higher air gap flux density can thus be obtained for deep magnet configurations. Since the magnetic shear stress and rating of the motor are proportional to the air gap flux density, a smaller and more power dense machine typically results.

FIG. 2 shows a detailed view of a conventional motor pole geometry arrangement using circumferential-oriented permanent magnets. The stator is comprised of a stator core backiron 70 held in place by the stator housing 75 and including a plurality of stator windings 80 aligned vertically along the radial axis of the motor. The rotor is comprised of alternating circumferential-oriented permanent magnets 85 and iron rotor pole pieces 90 around the outside of the rotor housing 92. As seen in FIG. 2, rectangular-shaped permanent magnets 85 are used in conventional circumferential-oriented magnet arrangements. Therefore, in order to hold the permanent magnets 85 in place against the centrifugal forces of the spinning motor, the rotor pole pieces 90 are bolted to the rotor housing 92, and an interpole wedge 95 is secured into slots near the top of adjacent rotor pole pieces 90. This interpole wedge 95 holds the permanent magnets 85 in place against the rotor housing 92.

One drawback of the circumferential as compared to the radial-oriented magnet arrangement is that the leakage flux is comparatively larger, as shown in FIG. 3. This leakage flux is that magnetic flux which does not cross the air gap and link the stator winding, thus providing no useful magnetic field. Both the upper rotor leakage flux path and the lower rotor leakage flux path are depicted in FIG. 3 as flux lines. This leakage flux is typically reduced by making the rotor core or shaft non-magnetic. A reduction in leakage flux would result in a corresponding reduction in the amount of magnet volume required to produce a given air gap flux density.

As briefly described above, the stator configuration for both types of rotor topologies may be the same. The stator generally consists of a slotted core 70 with a polyphase winding 80 similar to that in an induction motor or wound field synchronous machine.

The circumferential magnet arrangement (or "spoke topology") is well suited for propulsion applications. This is due, in part, to its superior resistance to demagnetization of the permanent magnets 85 resulting from either armature reaction or excessive temperature. Only a small component of the demagnetizing magnetic field appears across the permanent magnets 85 as a result of the armature ampere turns because the iron rotor pole head 90 provides an alternative low reluctance parallel path across the air gap (referred to as the q-axis path) so that the magnets 85 are partially shielded from the armature demagnetizing currents. Consequently, the circumferential magnet configuration is considered more stable and less sensitive to demagnetizing magnetic field effects than its radial counterpart.

However, a disadvantage of the conventional spoke circumferential topology as compared to the surface mounted radial magnet design is its poorer utilization of the magnetic material or magnets. The high proportion of leakage flux limits the torque production; it takes a greater volume of magnetic material to produce a given amount of torque. This is due in part to the greater amount of leakage flux in this design as shown in FIG. 3. As seen in the figure, a large percentage of the leakage flux occurs at the inner radius of the permanent magnets 85, which heretofore are of a rectangular shape. The circumferential magnet or spoke topology using rectangular shaped magnets 85 thus does not compare well against surface mounted permanent magnets 15 in FIG. 1(A) because the high proportion of leakage flux limits torque production.

Therefore, the surface mounted (radial) magnet topology can give the required electromagnetic torque with less leakage and thus, a smaller magnet volume than the spoke (circumferential) design, but the radial design is less desirable in several applications when torque harmonics, acoustic performance, permanent magnet surface eddy current losses, and resistance to demagnetization are considered. Thus, there is a desire or need to increase the torque density of spoke-type synchronous machine topologies. As such, the present invention, in at least one preferred embodiment, addresses one or more of the above-described and other limitations to the prior art using an approach to improve the torque per volume ratio of the spoke topology motor as compared to the more conventional surface mounted designs.

SUMMARY OF THE INVENTION

In accordance with at least one preferred embodiment, the present invention provides a permanent magnet synchronous machine with improved torque and power characteristics. A circumferential-oriented or spoke-type rotor assembly is used with alternating permanent magnets and magnetic pole pieces. In order to reduce the amount of leakage flux in the rotor, especially at the base or lower edge of the permanent magnets (rotor shaft side), a trapezoidal or otherwise tapered permanent magnet structure is used.

By alternating trapezoidal permanent magnets and magnetic pole pieces, there is a better utilization of the space in the motor. Specifically, there is a higher intensity magnetic field created in the air gap utilizing the same radial space in the motor without altering the weight or volume of the machine. In essence, relatively unused rotor material in the rotor pole is replaced with the flux producing permanent magnets.

In theory, the iron rotor poles in the rotor of the PM synchronous machine may be tapered to a point, but the realities of affixing the poles to the rotor shaft require some horizontal dimension in most applications. Analysis has shown that providing trapezoidal permanent magnets in which the stator-side length is at least 25% greater than the rotor-side length is beneficial in providing a substantially stronger magnetic field in the air gap.

Further, the trapezoidal permanent magnet orientation of the present invention is preferably used in combination with shaped iron pole pieces, which reduces the vibration and harmonics of the motor thereby advantageously affecting the acoustic properties of the motor (less noise). Power density and good acoustic performance are typically inversely related (because the acoustically beneficial iron is heavy). The present invention addresses the issue by providing an increase in motor power density while maintaining excellent acoustic properties.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

By altering the shape of the permanent magnets in a circumferential-oriented synchronous machine, the leakage flux may be reduced, thereby improving the torque or power density of the machine by increasing flux density across the air gap. In order to better understand the reasons for the shape alterations, certain fundamental properties and their interrelation must be understood. Therefore, a brief description of the theory behind the present invention will now be provided, followed by a more detailed discussion of several exemplary embodiments of the invention.

For a given motor design, the power output hp is related to the main design parameters of the motor by the well-known equation:

$$hp = CABD^2LN \qquad \text{Equation 1}$$

where:

C = a constant depending on units

A = armature surface current density

B = peak air gap flux density

D = rotor diameter

L = stator core length

N = rotational speed

This power output can be related to the motor torque T as:

$$T = (5252\ hp)/N \qquad \text{Equation 2}$$

Under general physics and geometric principles, this torque of the motor can also be represented as a force times a moment arm. Using $A_s$ as the surface area of the rotor and $\sigma$ as the magnetic shear stress, the total force F of the motor is given by:

$$F = \sigma \cdot A_s \quad \text{and} \quad \text{Equation 3}$$

$$A_s = \Pi D L \quad \text{Equation 4}$$

The magnetic shear stress $\sigma$ is the product of the magnetic and current loading of the motors:

$$\sigma = A \cdot B \quad \text{Equation 5}$$

By solving the simultaneous equations algebraically, the motor torque T can be represented as:

$$T = (\Pi \sigma D^2 L)/2 \quad \text{Equation 6}$$

This equation in its present form, however, does not directly show the relationship between the motor torque T and motor volume and weight.

Figure 1A:
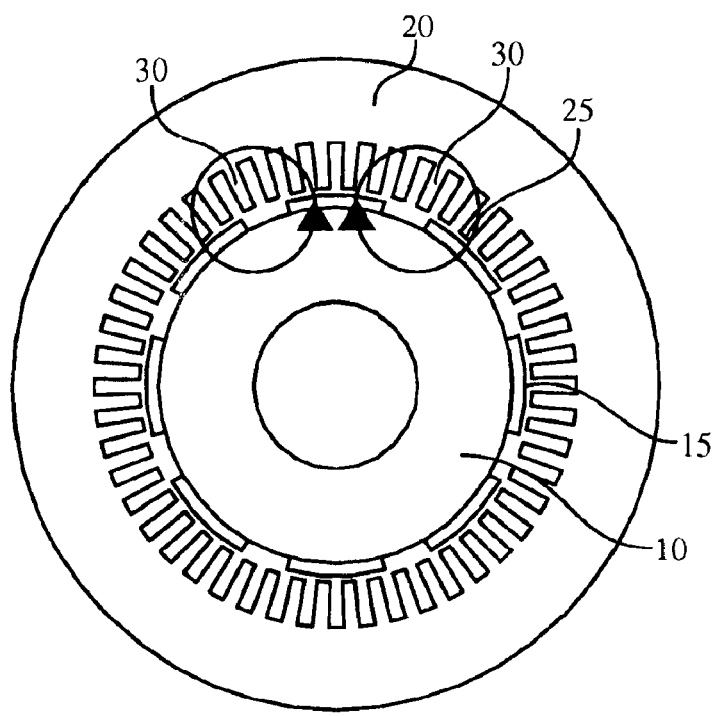
FIG. 1 is a block diagram of the general types of rotor topologies for permanent magnet synchronous machines including a radial-oriented magnet design (FIG. 1(A)) and a circumferential-oriented magnet design (FIG. 1(B))
Figure 1B:
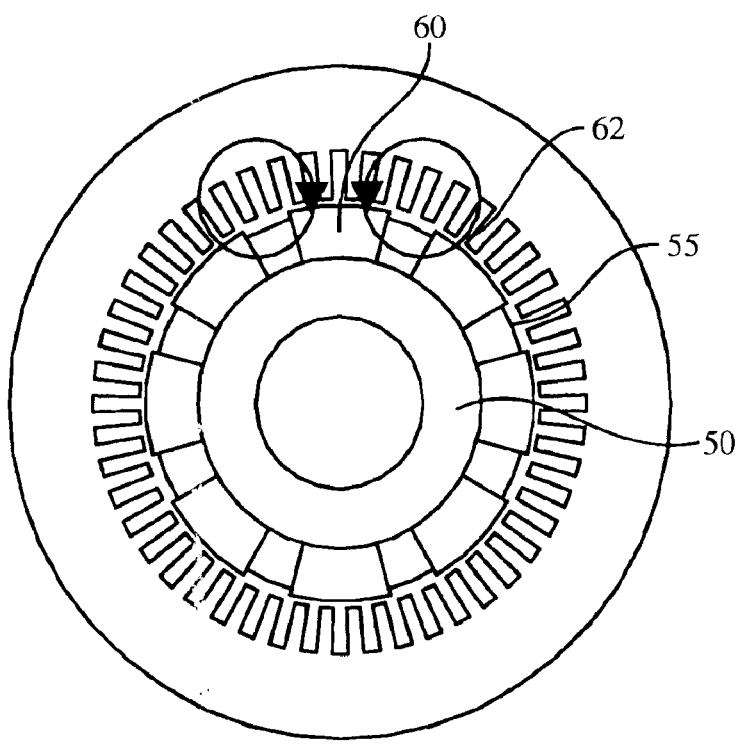
Figure 2:
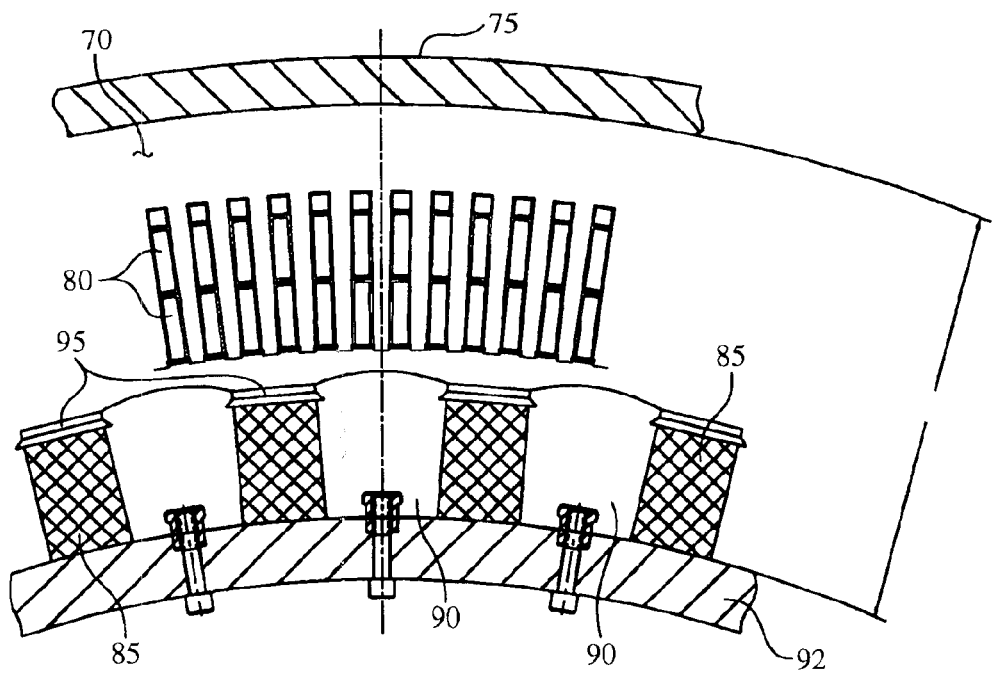
FIG. 2 shows a conventional motor pole geometry arrangement with circumferential-oriented permanent magnets.

Large, slow speed, radial field motors typically have an annular shaped cross-section with several poles, similar to that shown in FIG. 2, distributed around the circumference of the rotor. For this type of construction the active weight of the motor $W_a$ may be expressed as:

$$W_a = K \Pi D L h \quad \text{Equation 7}$$

where K=weight density of materials h=radial depth of annulus (radial length from the inner radius of the rotor to the outer radius of the stator core.

Finally, the torque density $T_d$ of the motor is characterized by the torque per weight of the motor. Therefore, the torque density $T_d$ can be expressed as the torque of the motor divided by the active weight of the motor ($T_d = T/W_a$). Combining with the above equations and solving for the torque density $T_d$ gives:

$$T_d = (\sigma D)/(2Kh)(\text{ft·lb/lb}) \quad \text{Equation 8}$$

After analyzing the above equation (8), it becomes apparent that to maximize the torque density $T_d$ of the motor, the largest rotor diameter should be chosen consistent with the application. The magnetic shear stress $\sigma$ should also be maximized while the radial depth h should be minimized. Unfortunately, the diameter, radial depth h, and magnetic shear stress $\sigma$ are not independent quantities. For example, the electromagnetic shear stress $\sigma$ of the motor is more than just a surface quantity since it depends on the entire magnetic circuit. Conversely, the value of radial depth h is highly influenced by the magnitude of the magnetic shear stress $\sigma$ and to a lesser extent the mechanical structure for the circumferential-oriented magnet arrangement. This depth h consists of the stator core backiron, stator slot depth, air gap length, and the rotor pole depth and support. For radial-oriented rotors with surface mounted magnets, the radial depth consists of the stator and rotor backiron, the stator slot depth, air gap length, and the magnetic thickness including pole shoes, if any.

The stator backiron thickness is directly related to the pole pitch and air gap flux density. High torque density, low speed permanent magnet motors can thus result from maximizing the number of magnetic poles for a given rotor diameter. This process is performed with due consideration to the basic electromagnetic, electrical, thermal and mechanical design of the motor. The result is a rotor/stator construction with short pole pitches. Considering that the radial depth of the stator backiron and the stator winding end turn length are proportional to the rotor pole pitch, the motor weight is reduced as well as its overall length.

Increases in the magnetic shear stress $\sigma$ via an increase in air gap magnetic flux density result in an increase in the backiron thickness assuming the thickness is not already set by mechanical or structural concerns. The stator slot depth is set by the cooling scheme for the motor. Better cooling allows for higher current densities in the windings and thus a smaller or shorter slot for the same current loading. Thus, increasing the magnetic shear stress $\sigma$ will improve the torque density $T_d$ assuming a corresponding improvement is made to the design so that the value of h is not increased disproportionately.

In at least one preferred embodiment, the present invention provides this improvement because the same relationship holds true for the rotor radial depth. Increases in the magnetic shear stress $\sigma$ via increasing the air gap magnetic field that can be made without a corresponding increase in the radial depth of the rotor poles/magnets will increase the torque density $T_d$ of the motor. In at least one preferred embodiment described below, the present invention allows for a significant increase in the air gap flux density with no change in the radial depth of the rotor pole.

Figure 3:
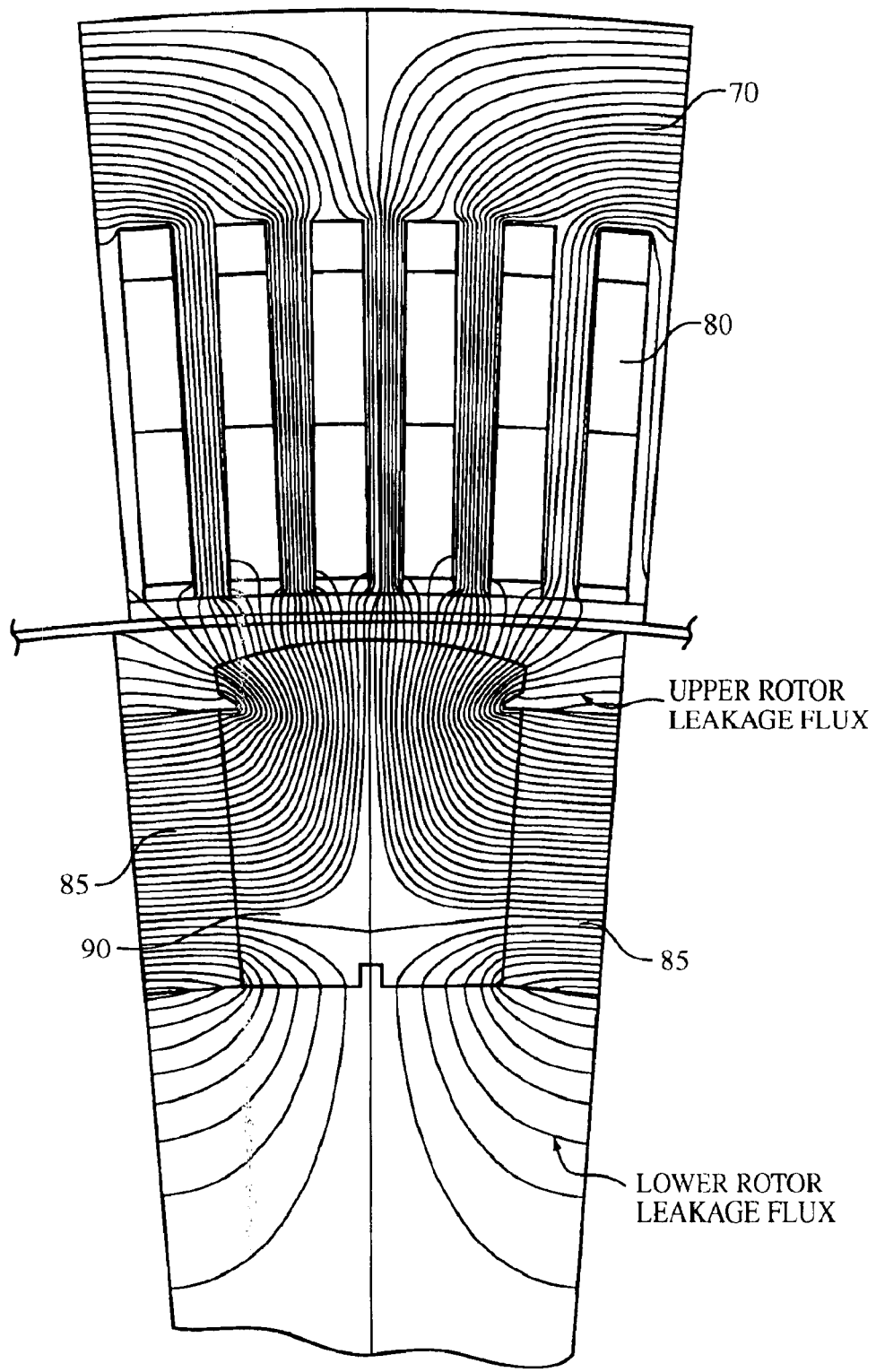
FIG. 3 depicts the magnetic field distribution within a single pole pitch using a conventional rectangular permanent magnet.

Close inspection of the magnetic field distribution for the conventional magnet/pole arrangement as illustrated in FIG. 3 shows that there is both a high leakage of magnet flux at the top and bottom of the permanent magnets 85 and high magnetic field nonuniformity in the pole 90. That is, both the magnet 85 and pole 90 are being magnetically underutilized.

Figure 4:
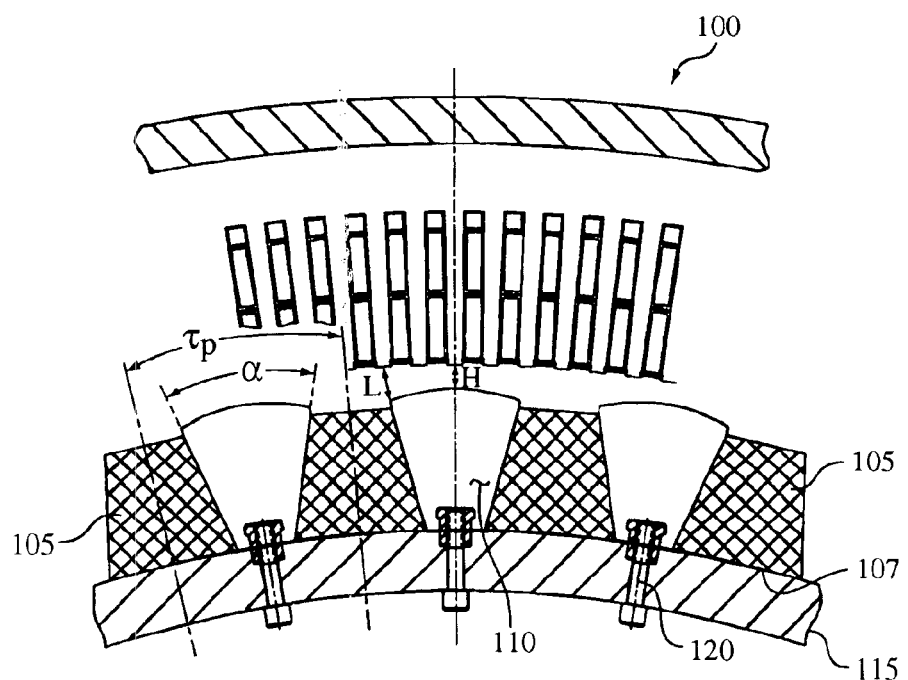
FIG. 4 details an exemplary motor pole geometry arrangement utilizing trapezoidal permanent magnets.

To improve this utilization and thus improve the torque density $T_d$ of the motor, FIG. 4 details an exemplary shaped permanent magnet 105 to be used in the circumferential-oriented motor design 100. Specifically, the proposed invention involves permanent magnets 105 shaped as a quadralateral or trapezoid, with the longer side dimension 107 on the rotor shaft side of the motor (as opposed to the stator side of the motor). By shaping the permanent magnets 105 in this manner, underutilized pole iron (from the lower part of pole piece 90 in FIG. 2) is replaced with magnetic material in the permanent magnet 105, thus increasing the effective length of the permanent magnets 105. In other words, the wider magnet dimension 107 at the base (rotor shaft side) of the permanent magnets 105 preferably reduces the bottom leakage flux in addition to the primary benefit of providing more magnet length or net magneto-motive force (mmf).

In more detail, FIG. 4 shows an exemplary motor pole geometry arrangement utilizing trapezoidal shaped permanent magnets 105. Alternating radially around the rotor shaft with the permanent magnets 105 are iron rotor pole pieces 110 that are secured to the rotor housing 115 by bolts 120 (or other affixing mechanism). The iron rotor pole pieces 110 are therefore shaped similar to inverse trapezoids with the narrow dimension on the rotor shaft side of the motor. Because the outer (longer) side of the pole pieces 110 extend at least partially over the outer side of the permanent magnets 105, the permanent magnets are held securely in place against the centrifugal motion of the rotating motor 100. The stator configuration may be the same as in conventional motor designs described above.

Theoretically, the horizontal lower dimension of the rotor pole pieces 110 should approach zero (i.e., a point) in order to maximize the magnetic properties of the motor (minimize the flux leakage), but this typically creates problems with affixing the rotor pole pieces 110 to the rotor housing 115. Therefore, the lower dimension of the rotor pole pieces 110 is preferably minimized for the bolts 120 that secure the pole pieces to the rotor housing 115. Experiments have shown that in an exemplary embodiment, the lower dimension of the pole pieces 110 approaches 1.25 inches for a magnet 105 with a radial vertical height of approximately 3.75 inches.

One common measurement of the shape of the iron pole pieces 110 is the pole tip-to-pitch ratio $\tau_p$. The ratio $\tau_p$ measures the arc length of the magnet and an iron rotor pole. Therefore, as depicted in FIG. 4, the pole pitch $\tau_p$ is the arc length between the center lines of two adjacent permanent magnets 105. The arc length of the upper dimension of the pole piece is shown in FIG. 4 as alpha ($\alpha$). The ratio of the arc length of the pole piece $\alpha$ to the arc length of the iron rotor pole $\tau_p$ defines the shape of the iron pole piece 105. Analysis has shown that exemplary values for this ratio are defined as:

$$0.6 < \alpha/\tau_p < 0.7 \qquad \text{Equation 9}$$

Another important measure of motor rotor pole shape is the curvature of the pole piece 110 with respect to the curvature of the entire rotor cylinder. This affects the characteristics of the air gap magnetic field shape and, hence, the acoustic properties of the motor. As seen in FIG. 4, a variable k is defined as the ratio of the distance L between the pole piece 110 and the stator bore at the sides of the pole piece to the distance H between the pole piece and the stator bore in the middle of the pole piece, or:

$$k = L/H \qquad \text{Equation 10}$$

Analysis has shown that a preferred k value for exemplary embodiments of the present invention is between 1.5 and 2.0 in order to provide acoustic benefits (1.5<k<2.0). In more detail, it should be noted that a k value of 1 indicates that the pole piece 110 has the same curvature as the entire rotor cylinder. Changing the curvature of the pole piece 110 relative to the curvature of the rotor reduces the harmonics (vibration) of the motor and, therefore, reduce the acoustic noise of the motor in operation. If the curvature of the pole piece 110 and rotor were the same, the acoustic response would include undesirable tones.

Figure 5:
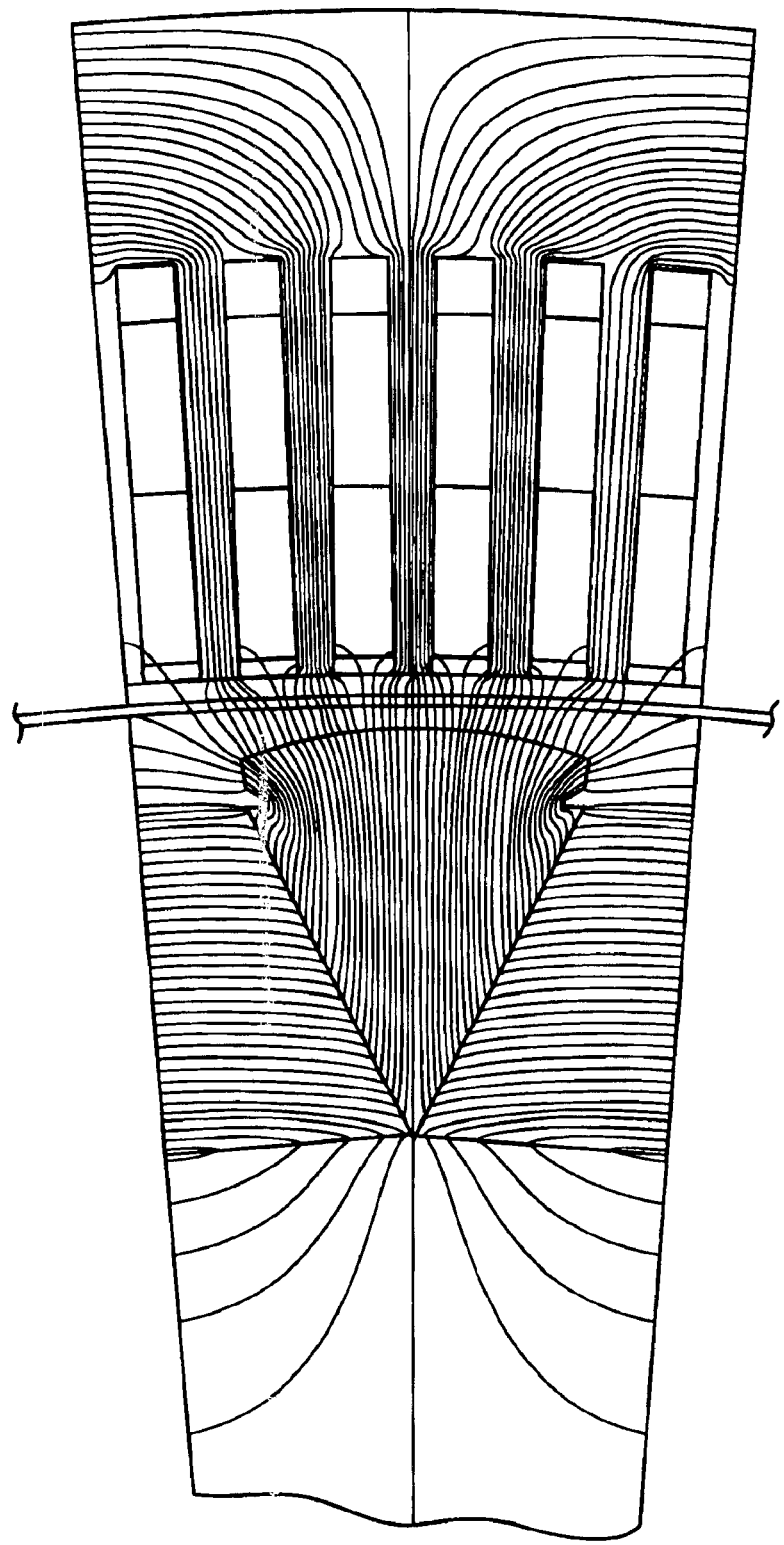
FIG. 5 depicts the magnetic field distribution within a single pole pitch utilizing strongly trapezoidal permanent magnets.
Figure 6:
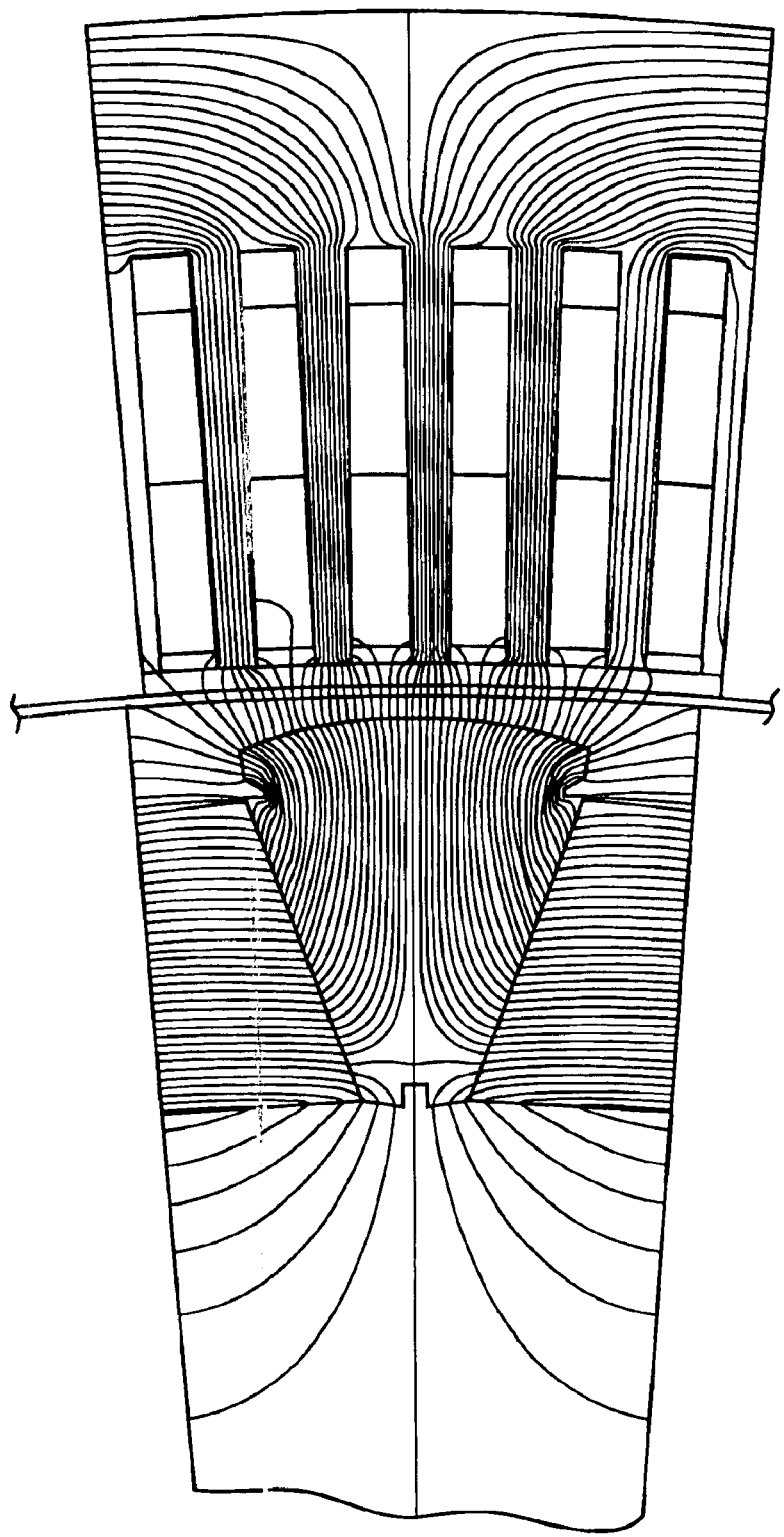
FIG. 6 depicts the magnetic field distribution within a single pole pitch utilizing mildly trapezoidal permanent magnets.

FIG. 5 provides an exemplary magnetic flux plot throughout a pole pitch for the extreme case of a strongly trapezoidal magnet, and FIG. 6 shows an exemplary plot corresponding to the weakly trapezoidal magnet geometry of FIG. 4 that includes its mechanical attachment method. Clearly the number of leakage flux lines just below the permanent magnet is reduced in the trapezoidal magnet designs when compared to the conventional rectangular pole piece flux diagram shown in FIG. 3. The relative proportion of flux lines crossing the air gap increases for the trapezoidal magnet cases compared with the rectangular magnet design. Therefore, additional air gap field is obtained due to the longer length of the lower portion of the permanent magnets.

Further, the trapezoidal shape of the permanent magnets 105 eliminates the need for a wedge above the magnets to radially contain them under the centrifugal forces experienced during rotation. As described above, because the upper regions of the pole piece 110 extend over the lower regions of the permanent magnets 105 (when viewed radially), the permanent magnets are held in place. The absence of the need for a wedge allows the permanent magnets 105 to be radially located near the outer diameter of the rotor—closer to the pole edge. In other words, taking the rotor shaft, pole pieces and permanent magnets as a rotor assembly, the upper or outer face of each of the permanent magnets is the outer face of the rotor assembly (rather than the wedge being the outer face of the rotor assembly). This additional benefit further minimizes the magnet leakage flux at the top of the permanent magnets since the magnet can be shifted radially outward to reduce the area on top of the magnet. All of these positive improvements allows for an increase in the magnetic air gap flux density and thus the magnetic shear stress $\sigma$ independent of the active volume, weight $A_w$, and annular depth h of the motor.

Figure 7:
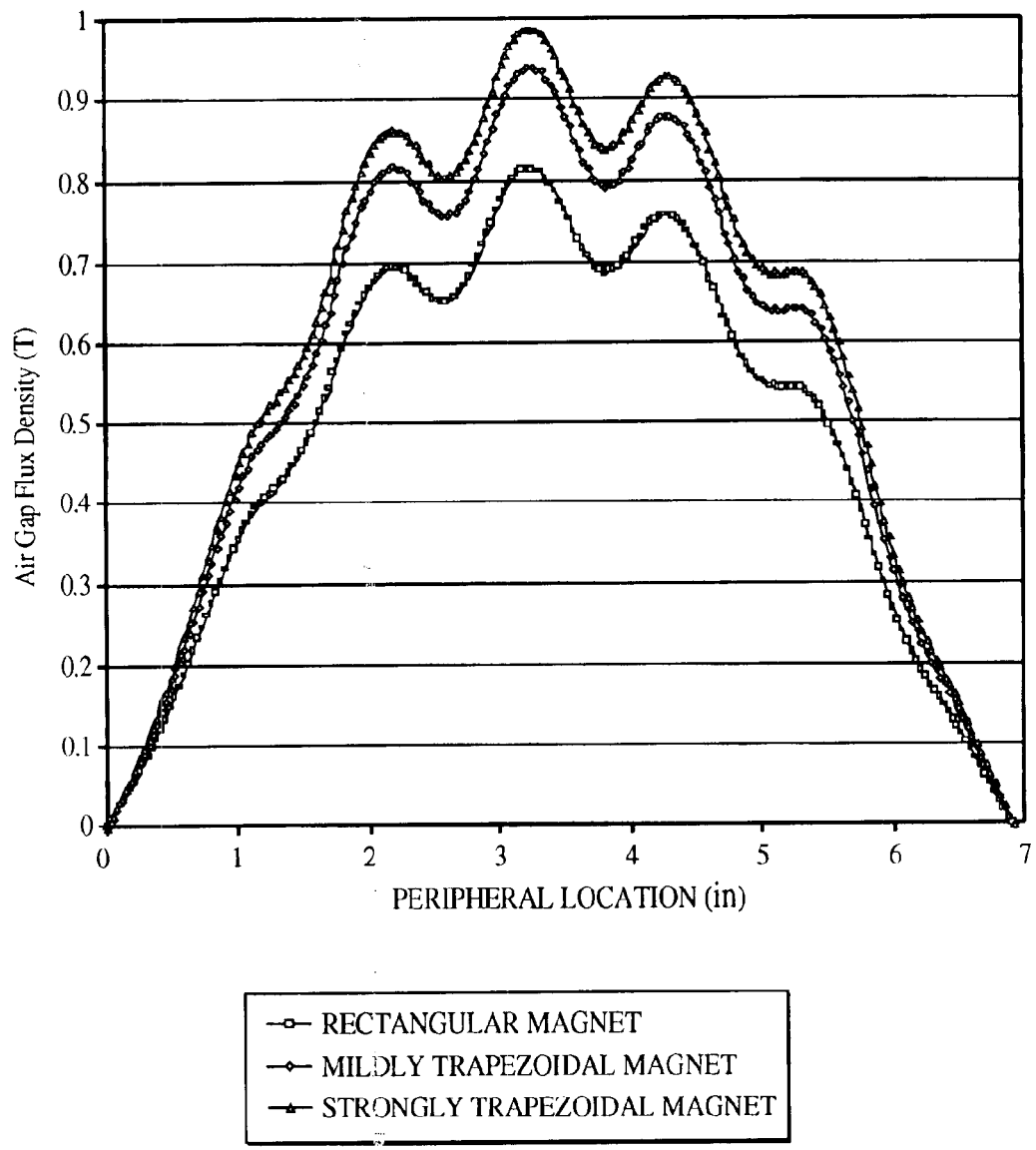
FIG. 7 shows exemplary magnetic field profiles for rectangular, mildly trapezoidal, and strongly trapezoidal permanent magnet designs.

FIG. 7 provides a direct comparison of the air gap flux density strength for the exemplary trapezoidal designs versus the conventional rectangular design. The more "trapezoidal-shaped" the magnet (i.e., the larger the difference between the lower and upper dimensions of the trapezoid shape of the permanent magnet) the larger the gains in the air gap field strength. The torque density $T_d$ resulting from the interaction of the air gap magnetic field and armature current is correspondingly improved. For the examples shown in FIG. 7 an improvement of up to a 22 percent increase in the fundamental air gap field strength is achieved. Moreover, it is judged that air gap field and torque gains of over 30 percent can potentially be obtained if the wedges above the magnets are eliminated (the magnet wedges were not removed for purposes of this diagram). This is a direct result of the optimization of the pole geometry with respect to electromagnetic and mechanical considerations allowed by the trapezoidal magnet shape.

An additional benefit that results from the increase in the air gap flux density for a given size air gap is that the torque margin of the motor is increased. Further, cooling enhancements that allow for an increase in the electrical current loading A can now be made while still maintaining acceptable torque margin and power factor. This increase in current loading A further increases the torque density $T_d$ of the motor. The magnetic pole geometry discussed here can be applied to all sizes and ratings of motors as well as permanent magnet generators to improve their torque/power density.

Further, as briefly described above, the PM synchronous motor of the present invention is preferably utilized in conjunction with iron rotor pole pieces 90 as in conventional motors. Because the iron pole piece 90 is integral to reduce the motor noise during operation, the present motor will retain the beneficial acoustic performance found in conventional motors while at the same time increasing the power density of the motor by virtue of the trapezoidal shaping of the permanent magnets 85. The trapezoidal or tapered permanent magnet structure, therefore, retains many positive attributes of conventional low noise motors while providing the benefit of additional torque.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A permanent magnet synchronous machine, comprising:

a rotor shaft;

a plurality of permanent magnets disposed circumferentially around the outside of the rotor shaft, wherein each of said permanent magnets comprises a first edge adjacent to said rotor shaft, a second edge opposite said rotor shaft, and at least two side edges between the first and second edges, wherein said first edge is at least approximately 25% longer than said second edge;

a plurality of pole pieces disposed circumferentially around the outside of the rotor shaft and disposed alternatingly with said permanent magnets; and a stator magnetically coupled to said plurality of permanent magnets.

2. The permanent magnet synchronous machine of claim 1, wherein each of said pole pieces is slotted at an end opposite the rotor shaft to interlock with said plurality of permanent magnets.

3. The permanent magnet synchronous machine of claim 2, wherein said interlocking between said plurality of permanent magnets and said plurality of pole pieces holds said permanent magnets against said rotor shaft while the synchronous machine is in rotational motion.

4. The permanent magnet synchronous machine of claim 1, wherein the ratio ($\alpha/\tau_p$) between the arc length of a pole piece ($\alpha$) to the arc length between adjacent permanent magnets ($\tau_p$) is between 0.6 and 0.7.

5. The permanent magnet synchronous machine of claim 1, wherein the ratio (k) of the distance between a rotor pole piece and the stator at the side of the pole piece (L) and the rotor pole piece and the stator in the center of the pole piece (H) is between 1.5 and 2.0.

6. The permanent magnet synchronous machine of claim 1, wherein said plurality of pole pieces are affixed to the rotor via a fixation means.

7. The permanent magnet synchronous machine of claim 6, wherein a horizontal dimension of the lower side of each of said plurality of pole pieces is minimized based on the horizontal dimensions of the fixation means.

8. The permanent magnet synchronous machine of claim 1, wherein said permanent magnet synchronous machine is a motor.

9. The permanent magnet synchronous machine of claim 1, wherein said permanent magnet synchronous machine is a generator.

10. The permanent magnet synchronous machine of claim 1, wherein said rotor shaft, said plurality of pole pieces and said plurality of permanent magnets combine to form a rotor assembly, further wherein an upper face of each of said plurality of permanent magnets is the outer face of the rotor.

11. A permanent magnet synchronous machine, comprising:

a rotor shaft;

a plurality of permanent magnets disposed circumferentially around the outside of the rotor shaft, wherein each of said permanent magnets comprises a first edge adjacent to said rotor shaft, a second edge opposite said rotor shaft, and at least two side edges between the first and second edges, wherein said first edge is at least approximately 25% longer than said second edge;

a plurality of pole pieces disposed circumferentially around the outside of the rotor shaft and disposed alternatingly with said permanent magnets; and a stator magnetically coupled to said plurality of permanent magnets, wherein the second edge of said plurality of permanent magnets is immediately adjacent to said stator.

12. The permanent magnet synchronous machine of claim 11, wherein each of said pole pieces is slotted at an end opposite the rotor shaft to interlock with said plurality of permanent magnets.

13. The permanent magnet synchronous machine of claim 12, wherein said interlocking between said plurality of permanent magnets and said plurality of pole pieces holds said permanent magnets against said rotor shaft while the synchronous machine is in rotational motion.

14. The permanent magnet synchronous machine of claim 11, wherein the ratio ($\alpha/\tau_p$) between the arc length of a pole piece ($\alpha$) to the arc length between adjacent permanent magnets ($\tau_p$) is between 0.6 and 0.7.

15. The permanent magnet synchronous machine of claim 11, wherein the ratio (k) of the distance between a rotor pole piece and the stator at the side of the pole piece (L) and the rotor pole piece and the stator in the center of the pole piece (H) is between 1.5 and 2.0.

16. A permanent magnet synchronous machine, comprising:

a rotor shaft;

a plurality of permanent magnets disposed circumferentially around the outside of the rotor shaft, wherein said permanent magnets are highly trapezoidal in shape and are characterized by an outer face on the opposite side of the permanent magnets from the rotor shaft, wherein said outer face is smaller in area than an inner face of said permanent magnets adjacent to the rotor shaft;

a plurality of pole pieces disposed circumferentially around the outside of the rotor shaft and disposed alternatingly with said permanent magnets, wherein said pole pieces are shaped such that the pole pieces secure said permanent magnets to said rotor shaft when said synchronous machine is in radial motion; and a stator magnetically coupled to said plurality of permanent magnets, wherein the upper face of said plurality of permanent magnets is immediately adjacent to said stator.

17. The permanent magnet synchronous machine of claim 1, wherein each of said plurality of permanent magnets includes at least four side edges.

18. The permanent magnet synchronous machine of claim 11, wherein each of said plurality of permanent magnets includes at least four side edges.

19. The permanent magnet synchronous machine of claim 16, wherein each of said plurality of permanent magnets includes at least four side edges.

20. A permanent magnet synchronous machine, comprising:

a rotor shaft;

a plurality of permanent magnets disposed circumferentially around the outside of the rotor shaft, wherein each of said permanent magnets comprises a first edge adjacent to said rotor shaft, a second edge opposite said rotor shaft, and at least two side edges between the first and second edges, wherein said first edge is at least approximately 25% longer than said second edge;

a plurality of pole pieces disposed circumferentially around the outside of the rotor shaft and disposed alternatingly with said permanent magnets; and a stator magnetically coupled to said plurality of permanent magnets, wherein the ratio ($\alpha/\tau_p$) between the arc length of a pole piece ($\alpha$) to the arc length between adjacent permanent magnets ($\tau_p$) is between 0.6 and 0.7.

21. A permanent magnet synchronous machine, comprising:

a rotor shaft;

a plurality of permanent magnets disposed circumferentially around the outside of the rotor shaft, wherein each of said permanent magnets comprises a first edge adjacent to said rotor shaft, a second edge opposite said rotor shaft, and at least two side edges between the first and second edges, wherein said first edge is at least approximately 25% longer than said second edge;

a plurality of pole pieces disposed circumferentially around the outside of the rotor shaft and disposed alternatingly with said permanent magnets; and a stator magnetically coupled to said plurality of permanent magnets, wherein the ratio (k) of the distance between a rotor pole piece and the stator at the side of the pole piece (L) and the rotor pole piece and the stator in the center of the pole piece (H) is between 1.5 and 2.0.

* * * * *

UNITED STATES PATENT AND TRADEMARK OFFICE
CERTIFICATE OF CORRECTION

PATENT NO. : 6,879,075 B2
DATED : April 12, 2005
INVENTOR(S) : Raymond Mark Calfo and Mark Peter Krefta It is certified that error appears in the above-identified patent and that said Letters Patent is hereby corrected as shown below:

<u>Column 3,</u>
Line 47, the word "stator" is to be changed to -- rotor --; and
Line 48, the word "rotor" is to be changed to -- stator --.

Signed and Sealed this

Fourth Day of October, 2005

JON W. DUDAS
*Director of the United States Patent and Trademark Office*